(12) United States Patent
Rejman et al.

(10) Patent No.: US 9,770,978 B2
(45) Date of Patent: Sep. 26, 2017

(54) TANK AND FILLER TUBE DEVICE WITH PROTECTIVE ARRANGEMENT

(71) Applicant: Pratt & Whitney Canada Corp., Longueuil (CA)

(72) Inventors: Marcin Rejman, Rzeszow (PL); Michel Labbe, Montreal (CA)

(73) Assignee: PRATT & WHITNEY CANADA CORPORATION (CA)

( * ) Notice: Subject to any disclaimer, the term of this patent is extended or adjusted under 35 U.S.C. 154(b) by 462 days.

(21) Appl. No.: 14/484,938

(22) Filed: Sep. 12, 2014

(65) Prior Publication Data

US 2016/0031316 A1    Feb. 4, 2016

Related U.S. Application Data

(60) Provisional application No. 62/031,573, filed on Jul. 31, 2014.

(51) Int. Cl.
| | |
|---|---|
| *B60K 15/04* | (2006.01) |
| *B64D 37/00* | (2006.01) |
| *B64D 37/06* | (2006.01) |
| *B64D 37/16* | (2006.01) |

(52) U.S. Cl.
CPC ........ *B60K 15/0406* (2013.01); *B64D 37/005* (2013.01); *B64D 37/06* (2013.01); *B64D 37/16* (2013.01); *B60K 2015/0438* (2013.01); *B60K 2015/0451* (2013.01)

(58) Field of Classification Search
CPC ...... B64D 37/005; B64D 37/02; B64D 37/04; B64D 37/06; B64D 37/08; B64D 37/14; B64D 37/16; B64D 37/20; B64D 37/22; B60K 15/0406; B60K 2015/0432; B60K 2015/0438; B60K 2015/0451; B60K 2015/0464; B60K 2015/048
See application file for complete search history.

(56) References Cited

U.S. PATENT DOCUMENTS

| | | | |
|---|---|---|---|
| 4,195,673 A | 4/1980 | Johnston et al. | |
| 4,811,763 A | 3/1989 | Kupske | |
| 5,027,868 A * | 7/1991 | Morris | B60K 15/03519 137/587 |
| 6,095,207 A * | 8/2000 | Enders | B60K 15/04 141/287 |
| 6,926,121 B2 | 8/2005 | Gates et al. | |
| 2008/0156800 A1 | 7/2008 | Mougenot | |
| 2016/0031316 A1* | 2/2016 | Rejman | B60K 15/0406 415/182.1 |

\* cited by examiner

*Primary Examiner* — Christopher Verdier
*Assistant Examiner* — Christopher R Legendre
(74) *Attorney, Agent, or Firm* — Norton Rose Fulbright Canada LLP

(57) ABSTRACT

A tank defines an inner cavity and at least an opening. A filler tube device comprises a tube passing through the opening in the tank, the tube forming a joint with at least one degree of freedom with the tank such that the tube is displaceable relative to the tank. The tube has an open end in the inner cavity of the tank, and an opposite open end outside of the tank, whereby the tube defines a passage for filling the tank. A sealing component is in the inner cavity of the tank, the sealing component configured for collaborating with the open end of the tube when the tube is moved into engagement therewith to close the open end of the tube inside the tank in a protective position.

19 Claims, 3 Drawing Sheets

TANK AND FILLER TUBE DEVICE WITH PROTECTIVE ARRANGEMENT

CROSS-REFERENCE TO RELATED APPLICATIONS

This application claims priority from provisional application No. 62/031,573 filed Jul. 31, 2014, the entire contents of which are incorporated by reference herein.

TECHNICAL FIELD

The present application relates to tanks in gas turbine engines, such as oil tanks.

BACKGROUND OF THE ART

In aircraft engines, it is a good practice to have protection against a missing or misinstalled tank filler cap. In the case of oil tanks, such protection is to prevent oil loss in situations where the oil filler cap is forgotten, misinstalled or if it comes off due to a failure during engine operation. Such a protection may allow completion of a flight mission by preserving oil in the tank and hence ensuring that engine oil consumption is maintained below the maximal oil consumption rate in a situation where the cap is missing.

SUMMARY

Therefore, in accordance with the present disclosure, there is provided an assembly comprising: a tank defining an inner cavity and at least an opening; a filler tube device comprising a tube passing through the opening in the tank, the tube forming a joint with at least one degree of freedom with the tank such that the tube is displaceable relative to the tank, the tube having an open end in the inner cavity of the tank, and an opposite open end outside of the tank, whereby the tube defines a passage for filling the tank; and a sealing component in the inner cavity of the tank, the sealing component configured for collaborating with the open end of the tube when the tube is moved into engagement therewith to close the open end of the tube inside the tank in a protective position.

Further details of these and other aspects of the present invention will be apparent from the detailed description and figures included below.

DESCRIPTION OF THE DRAWINGS

Reference is now made to the accompanying figures, in which.

DETAILED DESCRIPTION

Figure 1:
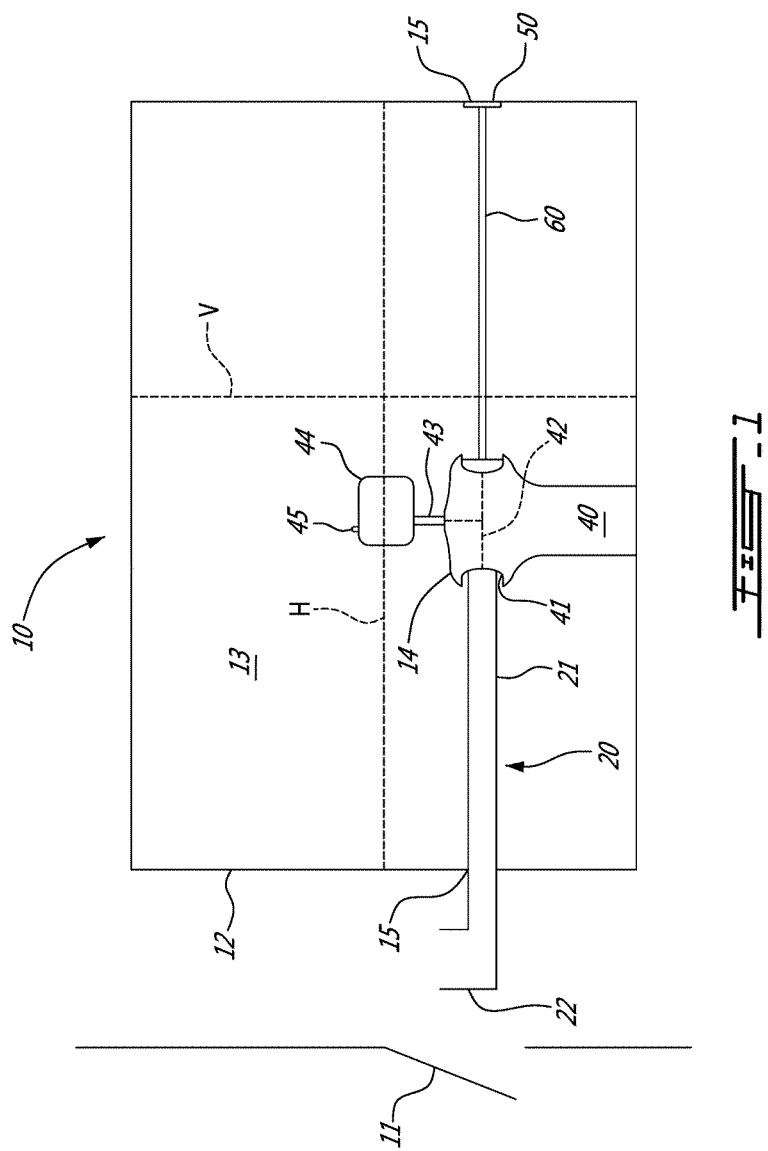
FIG. 1 is a schematic view of an assembly of a tank and filler tube device with protective arrangement in accordance with the present disclosure.

Referring to the drawings and more particularly to FIG. 1, a tank in accordance with the present disclosure is generally shown at 10. The tank 10 may be an oil tank or another type of tank, to contain liquids other than oil. In an embodiment, the tank 10 is an oil tank that is part of a gas turbine engine. In another embodiment, the tank 10 is part of a tilt rotor, and is located adjacent to a nacelle door 11 of the tilt rotor. In such an embodiment, there is limited space above the nacelle door 11, whereby filling the tank 10 involves constrained movements, and may require feeding oil or like liquids upwardly using appropriate equipment.

The tank 10 is defined by at least one tank wall 12. The tank 10 may have a plurality of interconnected walls or a single wall. For simplicity, the tank 10 is illustrated schematically as having a single tank wall 12. The tank wall 12 defines an inner cavity 13 (a.k.a., volume) of the tank 10. The inner cavity 13 will receive therein the liquid, such as oil. As the various components used with the tank 10 are designed to operate optimally as a function of given liquid levels in the tank 10, the threshold liquid levels are illustrated as H to illustrate the maximum liquid level when the tank 10 is horizontal, and V to illustrate the maximum liquid level when the tank is vertical, for instance during flight condition. In the case of the level V, the left-hand side of the tank 10 as in FIG. 1 would be above the right-hand side of the tank 10 in a vertical flight condition in some flight attitudes.

A sealing block 14 is located inside the inner cavity 13, and will be used as part of the protective arrangement against a missing/misaligned filler cap, to limit fluid loss out of the tank 10. Openings 15 are defined on opposite sides of the sealing block 14 in the tank wall 12, which openings 15 are used to fill the tank 10. It is pointed out that the tank 10 may comprise a single one of the openings 15, or a plurality, for instance to optionally render the tank 10 "universal", i.e., usable with different nacelle door locations. It is indeed considered to have the tank 10 with two openings 15, one for the right side and one for the left side, for a class of nacelles that may have doors oriented to the left side or right side. In the illustrated embodiment, the opening 15 of the left-hand side is used as the nacelle as a left-side door 11, while the opening 15 of the right-hand side is sealed closed, as there is no right-side nacelle door. Alternatively, the tank 10 could have a single left-side opening 15 as mentioned above.

An adaptor tube 15A may define the opening 15 instead of having the opening 15 defined in the tank wall 12, although this latter option is possible. Seals 16 (such as one of more O-rings, wiper rings, etc) may be located on an inner surface bounding the opening 15 and will collaborate with a filler tube to prevent or limit leaks between the opening 15 and the filler tube, as described hereinafter. Moreover, to the exterior of the opening 15, a receptacle 17 is defined, and is bound exteriorly by a flange 18. The receptacle 17 may be part of the adaptor tube 15A, as in FIGS. 1-2. Springs 19 or like biasing members are in the receptacle 17 for reasons to be explained hereinafter.

Figure 4:
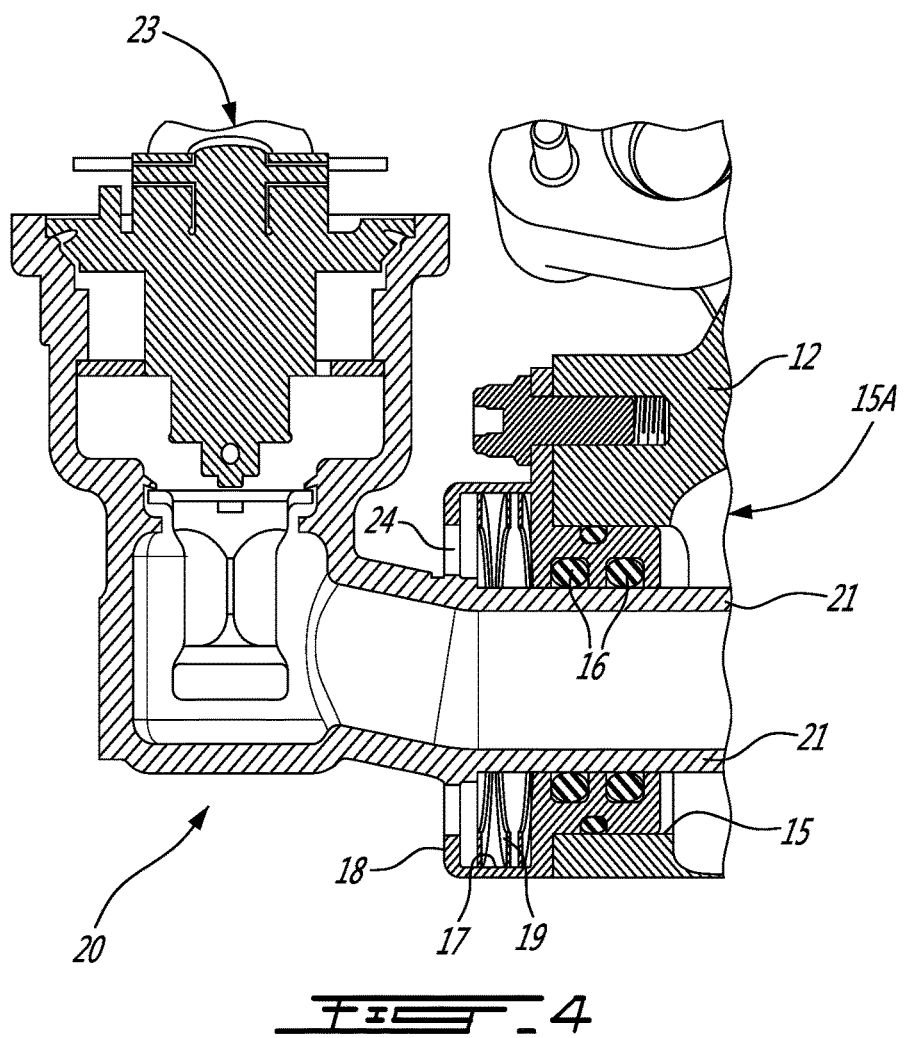
FIG. 4 is an enlarged cross-sectional view of an interaction between the filler tube device and the tank.
Figure 5:
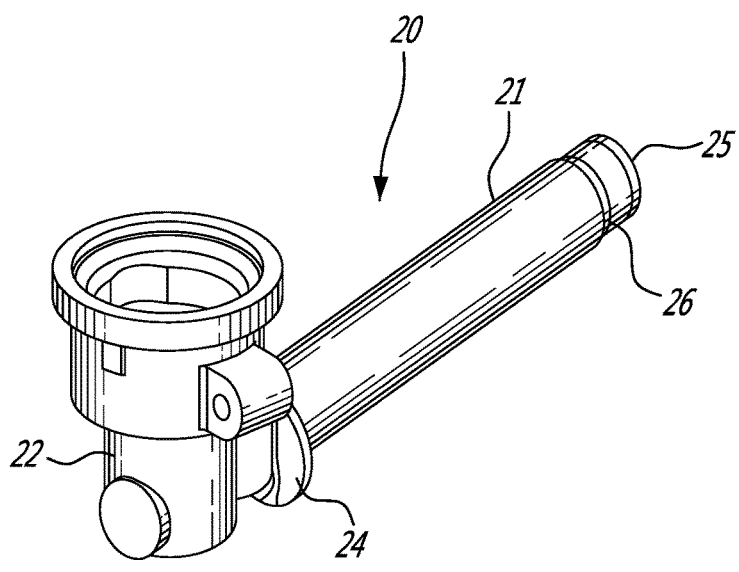
FIG. 5 is a perspective view of a filler end of the filler tube device of FIG. 1.

Referring to FIGS. 1, 4 and 5, a filler tube device for protective arrangement is generally shown at 20. The filler tube device 20 is the interface between the tank 10 and the user filling up the tank 10 with the appropriate fluid. The filler tube device 20 comprises an elongated tube 21 at a first end of which a filler adaptor 22 is located, through which fluid may be injected into the tank 10, as the elongated tube 21 is in fluid communication with the inner cavity 13. A filler cap 23 closes the filler adaptor 22 shut. For instance, the filler cap 23 may be screwed into engagement with the filler adaptor 22, although other interlocking arrangements are possible as well (bayonet-style lock, snap-fit, etc). The filler adaptor 22 is shown as being an elbow-type fitting, but may have different shapes. Moreover, the filler adaptor 22 may be integral with the elongated tube 21, for instance as a result of casting or machining such monolithic integral piece. In the illustrated embodiment, the filler adaptor 22 is axially transverse to an axis of the elongated tube 21, which axis may be parallel to the level line H, or may extend in a generally similar direction, without specifically being limited to a parallel relation. As best shown in FIG. 4, the interrelation between the opening 15 and the elongated tube 21 may be in the form of a cylindrical joint or equivalent (i.e., with a rotational degree of freedom about the longitudinal axis of the elongated tube 21, and/or a translational degree of freedom along the longitudinal axis of the elongated tube 21). With such degrees of freedom, the filler tube device 20 may be pulled away from the tank 10, and may be rotated to have the filler adaptor 22 in different orientations.

As best seen in FIGS. 4 and 5, a flange 24 is provided adjacent to the filler adaptor 22 on the elongated tube 21. The flange 24 may alternatively be part of the filler adaptor 22, or may be part of the elongated tube 21, etc. The flange 24 is secured to either one so as to rotate with the filler tube device 20 as a unit. More specifically, the axis of rotation being the elongated axis of the elongated tube 21, the filler adaptor 22 and flange 24 may be rotated such that the filler adaptor 22 points upwardly, as in FIG. 4, or downwardly, as in FIG. 1.

Figure 2:
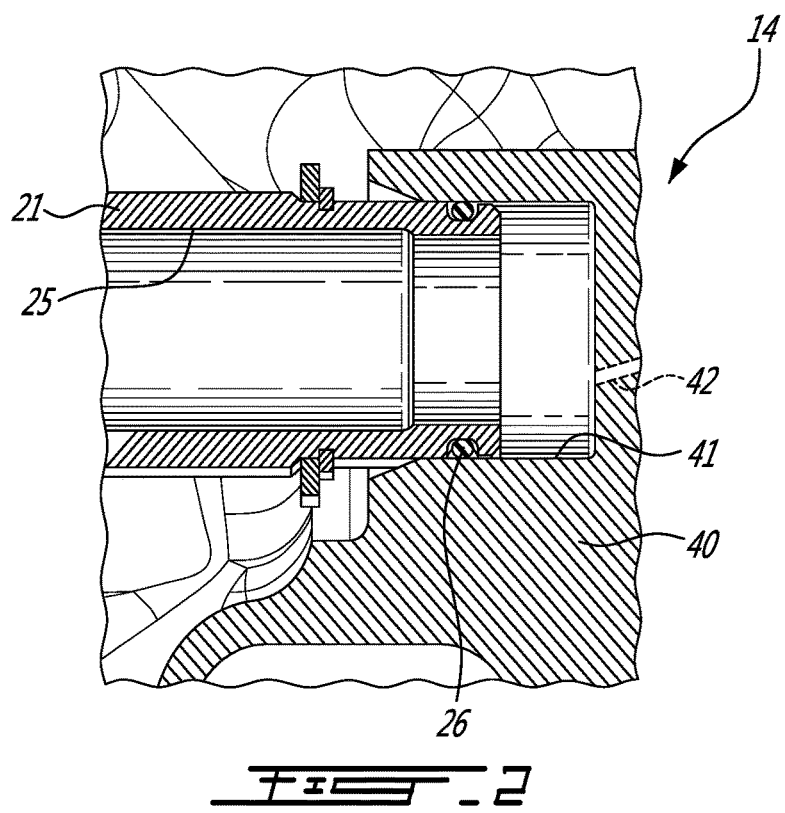
FIG. 2 is an enlarged view of a collaboration between an elongated tube of the filler tube device and a sealing block of the tank.
Figures 3A, 3B:
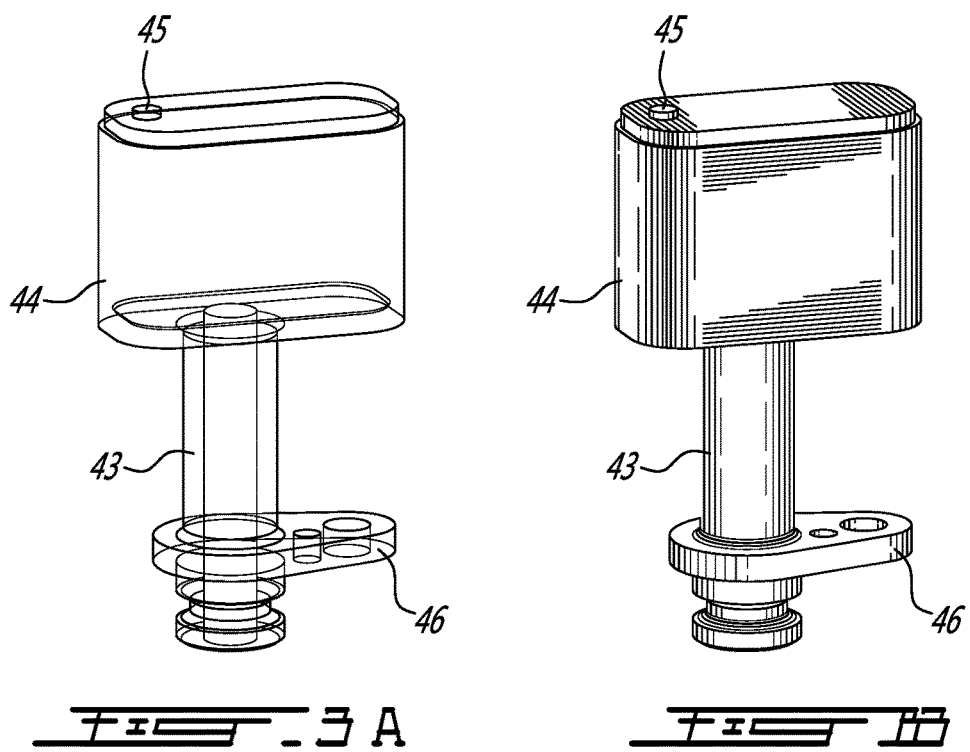
FIG. 3 is a perspective view of a vent reservoir and vent tube used with the sealing block of the tank of FIG. 1.

As seen in FIGS. 1 and 2, the elongated tube 21 further comprises a free open end 25, located inside the inner cavity 13 of the tank 10. The free open end 25 is the passage by which liquid fills the tank 10. Accordingly, when it is necessary to fill the tank 10, the free open end 25 is spaced apart from the sealing block 14 for the liquid to flow into the tank 10, in a filling position of the filler tube device 20. As shown in FIG. 2, a seal 26, such as an O-ring or the like, may be provided at the free open end 25, which seal could alternatively or additionally be in a receptacle for the tube 21 as described below.

Referring to FIGS. 1 and 2, the sealing block 14 is shown in greater detail. The sealing block 14 has a body 40. According to an embodiment, the body 40 is a monolithic block, although other configurations are considered, such as an assembly of pipes, etc. A receptacle 41 is defined in the body 40, and is sized so as to receive therein the free open end 25 in the manner shown in FIG. 2, in a protective position of the filler tube device 20. Accordingly, when the free open end 25 is received in the receptacle 41 as in FIG. 2, the seal 26 (or seals in the receptacle 41) contacts the surface of the receptacle 41, thereby sealing the assembly of the elongated tube 21 and the receptacle 41 from the surrounding environment, i.e., the inner cavity 13 of the tank 10. In this manner, liquid from the tank 10 cannot reach (or is limited in reaching) the receptacle 41 by passing between the elongated tube 21 and the surface of the receptacle 41.

As shown in FIG. 1, the sealing block 14 may also comprise a conduit 42. The conduit 42 is in fluid communication with the receptacle 41 at a first end, and with vent tube 43 at a second end, the vent tube 43 being in fluid communication with the vent reservoir 44. Accordingly, fluid that is in the elongated tube 21 when the elongated tube 21 is in the protective position of FIG. 2, may flow through the conduit 42 and the vent tube 43 to reach the vent reservoir 44. The vent reservoir 44 has a vent orifice 45. It is observed that the vent orifice 45 is above the threshold liquid levels H and V. A flange 46 helps in securing the vent tube 43 and vent reservoir 44 to the sealing block 14.

Hence, assuming that some liquid is in the elongated tube 21 following a filling operation—due to the fact that the elongated tube 21 is below the liquid level H, a pressure applied on the filler tube device 20 to bring the free open end 25 of the elongated tube 21 into the receptacle 41 in the protective position of FIG. 2 may cause a reduction of the volume in which liquid is lodged, i.e., the closed volume defined by the inside of the filler tube device 20 (with cap 23) and the receptacle 41. As liquids may be regarded as incompressible or quasi-incompressible, the displacement of the elongated tube 21 to the protective position of FIG. 2 would be opposed by the residual liquid in the closed volume. Hence, a venting system is provided to allow relief of the residual liquid in the closed volume. The venting system comprises the conduit 42 that forms an escape route by which the residual liquid may escape upon being pressed by the movement of the elongated tube 21 to the protective position of FIG. 2. The liquid then reaches the vent tube 43 and the vent reservoir 44. The conduit 42 may alternatively have an opposite exhaust end above the levels H and V, instead of the tube 43 and the reservoir 44. A diameter of the vent orifice 45 may be smaller than that of the conduit 42 and of the vent tube 43. Hence, the larger diameters of the conduit 42 and tube 43 allow liquid to reach the reservoir 44 without opposing substantial constraints to the movement of the elongated tube 21, with air at the surface of the liquid in the vent reservoir 44 escaping freely into the ambient air of the inner cavity 13 of the tank 10. On the other end, the relatively small diameter of the vent orifice 45 limits the amount of liquid from the inner cavity 13 of the tank 10 that may enter the vent reservoir 44, which oil could escape through the elongated tube 21 in the event that the filler cap 23 is absent or misaligned. It is pointed out that the location of the vent orifice 45 being above the levels H and V further limits the amount of liquid that can enter the vent reservoir 44 when the elongated tube 21 is in the protective position of FIG. 2.

It is pointed out that, although FIG. 1 shows the filler tube device 20 below the liquid level H, and the vent orifice 45 above the levels H and V, it is considered to have embodiments in which the filler tube device 20 is above the liquid level H. In such a case, the vent system including the conduit 42, the vent tube 43, the vent reservoir 44 and the vent orifice 45 may not be required.

In the embodiment featuring a pair of openings 15, blanking cover 50 covers the right-hand side opening 15, while blocking tube 60 blocks the receptacle 41 on the right-hand side of the sealing block 14. In this manner, liquid in the tank 10 cannot escape through the right-hand side conduit 42, seeing as the right-hand side conduit 42 is in fluid communication with the left-hand side conduit 42 that would otherwise form an escape route for the liquid of the tank 10, through the left-hand side elongated tube 21 if the filler cap 23 is incorrectly installed or absent.

Referring to FIGS. 4 and 5, it is observed that the flange 24 has a particular shape, i.e., not round. Likewise, the flange 18 of the adaptor 15A has an opening that is similar to that of the flange 24 such that the flange 24 may only enter into the receptacle 17 or disengaged therefrom by being properly aligned. Then, a rotation of the filler tube device 20 on its longitudinal axis will have the flange 24 collaborate with the flange 18 so as to lock the filler tube device 20 in the protective position of the filler tube device 20, as in FIG. 2. The spring 19 is provided to bias the flange 24 against the interior surface of the flange 18 with bayonet-like mating features locking the filler tube device 20 in the protective position. To release the filler tube device 20 from the protective position of FIG. 2, a pressure is applied on the filler tube device 20 to move the free open end 25 further into the receptacle 41 to free the mating features from one another, to then rotate the filler tube device 20 until the flange 24 is aligned with the opening of the flange 18, and finally pull the filler tube device 20 to the filling position.

While there is shown a receptacle 41 in the sealing block 14, it is pointed out that the sealing block 14 may alternatively be any other appropriate sealing component to close the free open end 25 of the tube 21, when the latter is moved into contact with the sealing component. For instance, the sealing component may be a projecting plug insertable into the free open end 25 of the elongated tube 21 in the protective position. Likewise, the sealing component may simply be a surface (e.g., of resilient sealing material) against which the free open end 25 abuts to close the free open end 25 from the interior of the inner cavity 13. In both these embodiments, a venting system may be used.

The above description is meant to be exemplary only, and one skilled in the art will recognize that changes may be made to the embodiments described without departing from the scope of the invention disclosed. For instance, the cap may be releasably secured directly to an end of the tube 21 outside of the tank 13. Still other modifications which fall within the scope of the present invention will be apparent to those skilled in the art, in light of a review of this disclosure, and such modifications are intended to fall within the appended claims.

The invention claimed is:

1. An assembly comprising:
   a tank defining an inner cavity and at least an opening;
   a filler tube device comprising a tube passing through one of the at least an opening in the tank, the tube forming a joint with at least one degree of freedom with the tank such that the tube is displaceable relative to the tank, the tube having an open end in the inner cavity of the tank, and an opposite open end outside of the tank, whereby the tube defines a passage for filling the tank; and
   a sealing component in the inner cavity of the tank, the sealing component configured for collaborating with the open end of the tube in the tank when the tube is moved into engagement therewith to close the open end of the tube inside the tank in a protective position, the sealing component being a block having a receptacle extending from an opening into the block to an end in the block, the receptacle for receiving the open end of the tube in the protective position, the tube having its open end opened inside the tank when moved out of engagement with the receptacle.

2. The assembly according to claim 1, wherein the at least one degree of freedom is a translational degree of freedom, such that the tube is slidingly displaceable from the protective position to a filling position in which the open end in the tank is open to the inner cavity.

3. The assembly according to claim 2, wherein the at least one degree of freedom further comprises a rotational degree of freedom about a longitudinal axis of the tube, and further wherein a filling adapter is mounted to the open end of the tube outside of the tank, an orientation of the filler adapter being adjustable by rotating the tube about the rotational degree of freedom.

4. The assembly according to claim 3, wherein the filling adapter has an elbow-type body.

5. The assembly according to claim 3, further comprising a cap releasably secured to an open end of the filling adapter.

6. The assembly according to claim 1, further comprising a venting system comprising at least one conduit having a first end in fluid communication with the sealing component, and a second end being open to the inner cavity of the tank above at least one threshold liquid level of the tank, with the tube being below the at least one threshold liquid level of the tank.

7. The assembly according to claim 6, wherein the venting system comprises a liquid reservoir between the first end and the second end.

8. The assembly according to claim 7, wherein the at least one conduit extends from the first end to the liquid reservoir, and further wherein a diameter of the at least one conduit from the first end to the liquid reservoir is greater than a diameter of the second end.

9. The assembly according to claim 8, wherein the second end is an exhaust port in the liquid reservoir.

10. The assembly according to claim 6, wherein the second end of the venting system is open to the inner cavity of the tank above a first of the at least one threshold liquid level of the tank defined for a horizontal orientation of the tank, and above a second of the at least one threshold liquid line of the tank defined for a vertical orientation of the tank.

11. The assembly according to claim 1, further comprising a bayonet system between the tank and the open end of the tube outside of the tank to releasably lock the tube in the protective position.

12. The assembly according to claim 1, further comprising an adaptor tube interfaced between a first one of the at least an opening of the tank and the tube, the adaptor tube forming the joint with the tube.

13. The assembly according claim 12, wherein the adaptor tube comprises a receptacle outside of the tank, and further wherein the filler tube device comprises a flange outside of the tank, the receptacle accommodating the flange to releasably lock the tube in the protective position.

14. The assembly according to claim 13, further comprising a biasing device in the receptacle to bias the flange against a surface of the receptacle to releasably lock the tube in the protective position.

15. The assembly according to claim 1, wherein the at least an opening comprises two said openings, and wherein the sealing component comprises a first portion adapted to close the open end of the tube in the tank if mounted to a first one of the openings, and a second portion adapted to close the open end of the tube in the tank if mounted to a second one of the openings.

16. The assembly according to claim 15, further comprising a blanking cover to block the one of the openings if it is without the tube.

17. The assembly according to claim 15, further comprising a plug secured to one of the first portion and the second portion corresponding to the one of the openings if it is without the tube.

18. A gas turbine engine comprising:
   a nacelle defining an inner volume, and a door to access the inner volume; and
   the assembly according to claim 1 in the inner volume of the nacelle, the one of the at least an opening of the tank and the open end of the tube outside of the tank being aligned with the door such that an end of the filler tube device is displaceable to a filling portion outside of the nacelle.

19. The gas turbine engine according to claim 18, wherein the gas turbine engine is a tilt rotor.

* * * * *